US009041402B2

(12) United States Patent  
Lalonge et al.

(10) Patent No.: US 9,041,402 B2
(45) Date of Patent: May 26, 2015

(54) DETECTING AN ABNORMALITY OF A SWITCH IN A HIGH VOLTAGE ELECTRICAL SUBSTATION

(75) Inventors: Patrick Lalonge, McMasterville (CA); Robert Jeanjean, Caluire (FR)

(73) Assignee: EHT INTERNATIONAL INC., Boucherville, Quebec (CA)

( * ) Notice: Subject to any disclaimer, the term of this patent is extended or adjusted under 35 U.S.C. 154(b) by 285 days.

(21) Appl. No.: 13/514,731

(22) PCT Filed: Dec. 8, 2010

(86) PCT No.: PCT/CA2010/001953
§ 371 (c)(1),
(2), (4) Date: Jul. 24, 2012

(87) PCT Pub. No.: WO2011/069256
PCT Pub. Date: Jun. 16, 2011

(65) Prior Publication Data
US 2012/0280691 A1  Nov. 8, 2012

Related U.S. Application Data

(60) Provisional application No. 61/267,801, filed on Dec. 8, 2009.

(51) Int. Cl.
*B62M 23/02* (2010.01)
*H01H 71/10* (2006.01)
*H02H 7/22* (2006.01)
*H02B 13/065* (2006.01)
*H01H 11/00* (2006.01)
*H01H 31/34* (2006.01)

(52) U.S. Cl.
CPC .............. *H02H 7/222* (2013.01); *H02B 13/065* (2013.01); *H01H 11/0062* (2013.01); *H01H 31/34* (2013.01)

(58) Field of Classification Search
CPC ...... G01R 31/34; G01R 31/327; G01R 33/07; G01R 33/09; G01R 33/02; G01R 33/072; G01R 33/077; G01R 31/025
USPC ....................... 324/160–180, 207.11–207.13, 324/207.21–207.26, 545, 765.01, 415–424
See application file for complete search history.

(56) References Cited

U.S. PATENT DOCUMENTS

| 2,716,210 | A | * | 8/1955 | Owens | 318/146 |
| 3,588,680 | A | * | 6/1971 | Athey | 324/415 |
| 4,450,398 | A | * | 5/1984 | Bose | 318/803 |
| 7,501,775 | B2 | * | 3/2009 | Valdemarsson et al. | 318/16 |
| 2005/0179428 | A1 | * | 8/2005 | Hiramine et al. | 324/177 |
| 2008/0315870 | A1 | * | 12/2008 | May | 324/239 |

FOREIGN PATENT DOCUMENTS

JP  2005-132275  *  5/2005  ............. B62M 23/02

OTHER PUBLICATIONS

English Machine translation of JP 2005-132275.*

* cited by examiner

*Primary Examiner* — Patrick Assouad
*Assistant Examiner* — Taqi Nasir
(74) *Attorney, Agent, or Firm* — Norton Rose Fulbright Canada LLP

(57) ABSTRACT

There is provided a method for determining an abnormality during operation of a high voltage disconnect switch, the method comprising: determining a current position of an arm of the high voltage disconnect switch operatively connected to a motor, the motor being operated for driving the arm of the high voltage disconnect switch; determining a torque of the motor corresponding to the current position of the arm; comparing the torque of the motor to a torque threshold for the current position of the arm; and outputting an abnormality signal based on the comparison.

20 Claims, 11 Drawing Sheets

DETECTING AN ABNORMALITY OF A SWITCH IN A HIGH VOLTAGE ELECTRICAL SUBSTATION

CROSS-REFERENCE TO RELATED APPLICATIONS

The present application claims priority under 35USC paragraph 119(e) of U.S. Provisional Patent Application filed on Dec. 8, 2009 and bearing Ser. No. 61/267,801.

TECHNICAL FIELD

The present invention relates to the field of the supervision and protection of a high voltage electrical substation, and particularly to methods and apparatus for detecting abnormalities of a high voltage switch.

BACKGROUND

An electrical substation is a subsidiary station of electricity generation, transmission and distribution where voltage is transformed from high to low or vice-versa using transformers. Electrical substations are usually provided with a control module which monitors and controls the different elements of the substation, such as disconnect switches. Because a malfunction of a disconnect switch may damage the electrical substation, the position of the arm of the disconnect switch is usually monitored by a sensor positioned adjacent to the disconnect switch. However, in some instances, the position of the arm is not sufficient for determining that the disconnect switch does not operate adequately.

Therefore, there is a need for an improved method and apparatus for detecting an abnormality of a high voltage switch.

SUMMARY

According to a first broad aspect, there is provided a method for determining an abnormality during operation of a high voltage disconnect switch, the method comprising: determining a current position of an arm of the high voltage disconnect switch operatively connected to a motor, the motor being operated for driving the arm of the high voltage disconnect switch; determining a torque of the motor corresponding to the current position of the arm; comparing the torque of the motor to a torque threshold for the current position of the arm; and outputting an abnormality signal based on the comparison.

According to a second broad aspect, there is provided an apparatus for determining an abnormality during operation of a high voltage disconnect switch, the apparatus comprising: a memory having a database stored therein, the database comprising a torque threshold for different positions of an arm of the high voltage disconnect switch operatively connectable to a motor, the motor being operable for driving the arm of the high voltage disconnect switch; and a torque comparison unit having a processing unit configured for receiving a current position of the arm and a torque of the motor corresponding to the current position, comparing the torque of the motor to the torque threshold for the current position of the arm in order to obtain a comparison result, and outputting an abnormality signal based on the comparison result.

In accordance with a further broad aspect, there is provided a system for determining an abnormality during operation of a high voltage disconnect switch, the system comprising: a position sensor for determining a current position of an arm of the high voltage disconnect switch operatively connected to a motor, the motor being operated for driving the arm of the high voltage disconnect switch; a torque determining module adapted to determine a torque of the motor corresponding to the current position of the arm; and an abnormality detecting module connected to the position sensor and the torque determining module and adapted to compare the torque of the motor to a torque threshold for the current position of the arm to obtain a comparison result and output an abnormality signal based on the comparison result.

It should be understood that the term "switch" is to include any type of motorized disconnectors or disconnect switches that serve to open and close a circuit at high voltage.

It should be understood that the term "processor" or "processing unit" is used to represent any circuit which can process data and/or signals. Central processing unit (CPU), microprocessors, and microcontrollers are examples of processors.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present method allows for detecting an abnormality during the opening and/or closing of a high voltage switch. Usually, a switch comprises an arm movable between an open and a closed position. When the switch is closed, the arm engages a break jaw and electric current is allowed to flow through the switch. When the switch is open, the arm is away from the break jaw, thereby preventing the electric current to propagate through the switch. Usually, a motor is operatively connected to the arm of the switch via a shaft for example, and the position and displacement speed of the arm is controlled via the motor. While closing and/or opening a switch, the speed of displacement of the arm is usually varied as function of time.

In one embodiment, the opening and closing of the switch are automated and corresponding speed values for the switch arm as a function of the arm location or time are predetermined. When the switch has to be opened or closed, the motor is actuated to move the arm switch in accordance with the corresponding predetermined arm speed.

Figure 1:
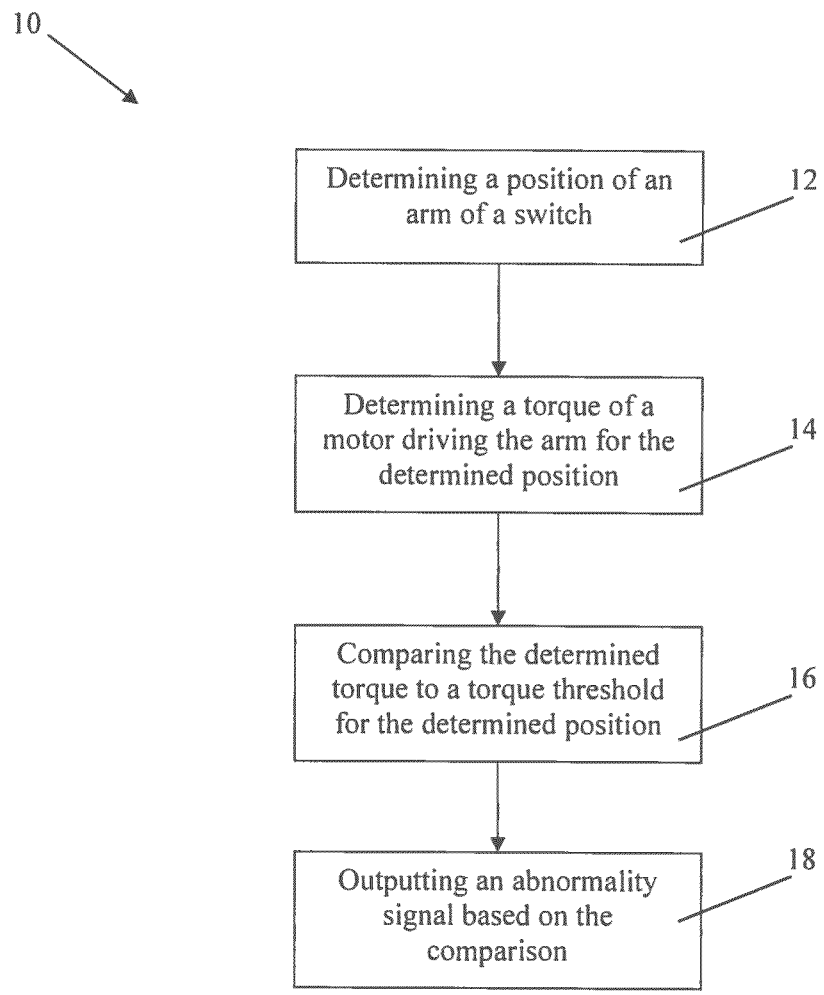
FIG. 1 is a flow chart illustrating an embodiment a method for detecting an abnormality of a switch.

FIG. 1 illustrates one embodiment of a method 10 for detecting an abnormality during the operation of a high voltage switch, i.e. during the opening or closing of the switch. A motor is operatively connected to the high voltage switch in order to drive the arm of the switch between an open and a closed position, and vice versa.

The first step 12 comprises the determination of the position of the arm of the switch. Any adequate sensor adapted to determine the position of the arm of the switch may be used. For example, the position sensor may be a mechanical sensor, an optical sensor, and the like. The second step 14 comprises the determination of a torque of the motor corresponding to the determined position. At step 16, the determined torque of the motor is compared to a torque threshold for the determined position of the arm and an abnormality signal is output based on the comparison between the torque and the torque threshold at step 18. For example, the abnormality signal can be output when the determined torque is less or greater than the predetermined torque threshold.

The abnormality signal may be an alarm signal. The abnormality signal may further comprise information indicative of the type of abnormality. For example, the abnormality signal may indicate whether the determined torque is greater or less than the predetermined torque threshold. The abnormality signal may also be indicative of the cause of the encountered problem.

In one embodiment, the method 10 is performed substantially continuously during the opening or closing of the switch arm. The determination of the position of the arm and the determination of the corresponding motor torque are performed substantially simultaneously during the motion of the arm to provide a substantially real-time monitoring of the performance of the switch. In another embodiment, the determination of the position of the arm and the corresponding motor torque, and the comparison step are performed in a stepwise manner. For example, the steps 12, 14, and 16 are performed at predetermined time intervals during the opening or closing of the arm, such as every 0.5, 1, or 2 seconds for example.

In one embodiment, the torque threshold is a maximum threshold and the abnormality signal is output when the determined torque of the motor corresponding to the determined arm position exceeds the maximum torque threshold for the determined arm position. In another embodiment, the torque threshold is a minimum torque threshold and the abnormality signal is output when the determined torque corresponding to the determined arm position is inferior to the minimum torque threshold for the determined position. In a further embodiment, the determined torque is compared to two torque thresholds, i.e. a minimum torque threshold and a maximum torque threshold. The two torque thresholds define a normal operation range wherein the switch is assumed to operate safely. If the determined torque corresponding to the determined arm position is superior to the maximum torque threshold for the determined arm position or inferior to the minimum torque threshold for the determined arm position, the switch is assumed to operate abnormally and an abnormality signal is output at step 18.

In one embodiment, the torque threshold depends on the operation cycle of the switch. A first torque threshold is set for the opening of the switch and a second and different torque threshold is set for the closing of the switch. When a maximum torque threshold and a minimum torque threshold are used to define a normal operation range, the opening and closing of the switch are each associated with a respective normal range of operation.

In one embodiment, after the output of the abnormality signal, the motion of the arm is stopped. In another embodiment, the switch is moved back to its initial position at a speed lower than a normal operation speed in order to avoid further potential damages to the switch. In a further embodiment, the switch is moved back to its target position at a speed lower than a normal operation speed in order to avoid potential damages to the switch.

It should be understood that the motor operating the switch can be any adequate motor which allows the motion of the switch arm between the open and closed positions. Examples of adequate motors comprise hydraulic motors, Alternating Current (AC) electric motors, Direct Current (DC) electric motors, and the like.

Figure 2A:
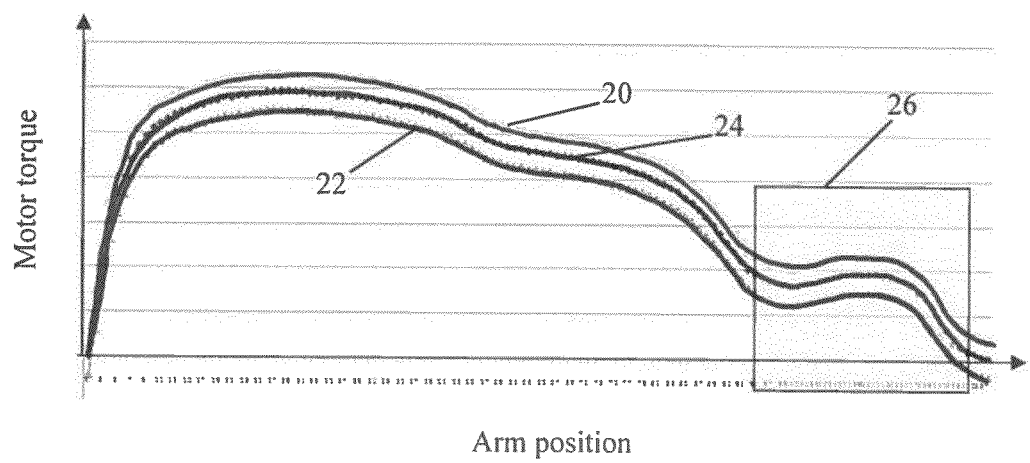
FIG. 2a is a graph of the torque of a motor controlling a disconnect switch as a function of the location of the disconnect switch during normal operation of the switch, in accordance with an embodiment.

FIG. 2a illustrates one embodiment of a torque of a motor operatively connected to a switch arm during normal operation of a switch. Curve 20 corresponds to a maximum threshold above which an abnormal operation of the switch is determined. The maximum threshold defines a maximum torque value for the motor as a function of the position of the switch arm. Curve 22 corresponds to a minimum threshold below which an abnormal operation of the switch is determined. The minimum threshold defines a minimum torque value for the motor as a function of the position of the switch arm. As a result, each position of the switch arm between its initial position and its target position is associated with a minimum and a maximum torque thresholds which define a normal operation range for the switch. During the motion of the arm, the position of the arm is determined (step 12), and for each determined position the corresponding torque of the motor is determined (step 14), thereby providing curve 24. For each determined arm position, the determined motor torque 24 is compared to its respective maximum 20 and minimum 22 thresholds. Since curve 24 lies between curves 22 and 24, the operation of the switch is considered as normal and no abnormality signal is output.

Figure 2B:
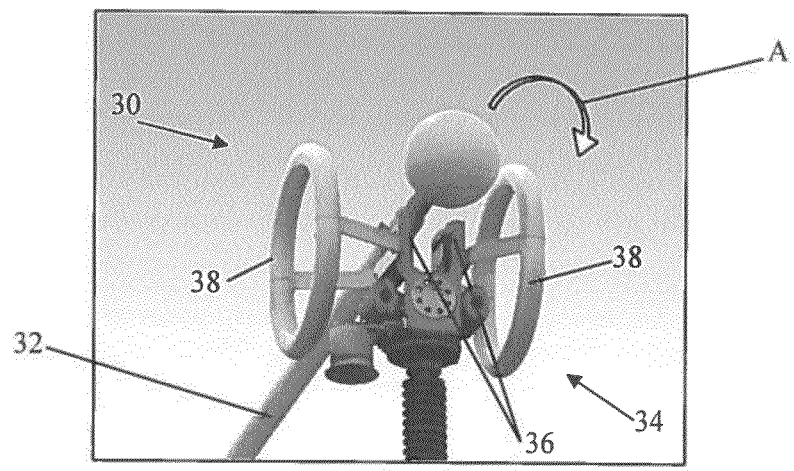
FIG. 2b illustrates a normal closing operation of the disconnect switch referred to in FIG. 2a during which the arm of the disconnect switch inserts into a jaw.

Referring to FIGS. 2a and 2b, section 26 illustrates the torque of the motor when the arm 32 of the switch 30 is about to engage a break jaw 34 of the switch 30. The break jaw 34 comprises two fingers 36 and two support rings 38. The switch 30 is adequately closed when the arm 32 is snugly received between the fingers 36 of the break jaw 34. In order to adequately close the switch 30, the motor (not shown) is actuated to move the arm 32 in accordance with arrow A. When the arm 32 engages the fingers 36 of the jaw 34, the resistance to the motion arm 32 increases which results in an increased motor torque as illustrated in section 26.

In one embodiment of the method 10, it is possible to detect an abnormal operation of the switch and diagnose the problem of the switch. For example, depending on whether the determined torque is superior to the maximum threshold 20 or inferior to the minimum threshold 22, and the location (i.e. the position of the switch arm 32) where the determined torque goes outside of the normal operation range defined by the thresholds 20 and 22, it is possible to determine whether the arm 32 is prevented from moving, a piece of equipment is broken, the arm 32 failed to engage the break jaw 34, the arm engages a support ring 38 of the break jaw 34, etc.

Figure 3A:
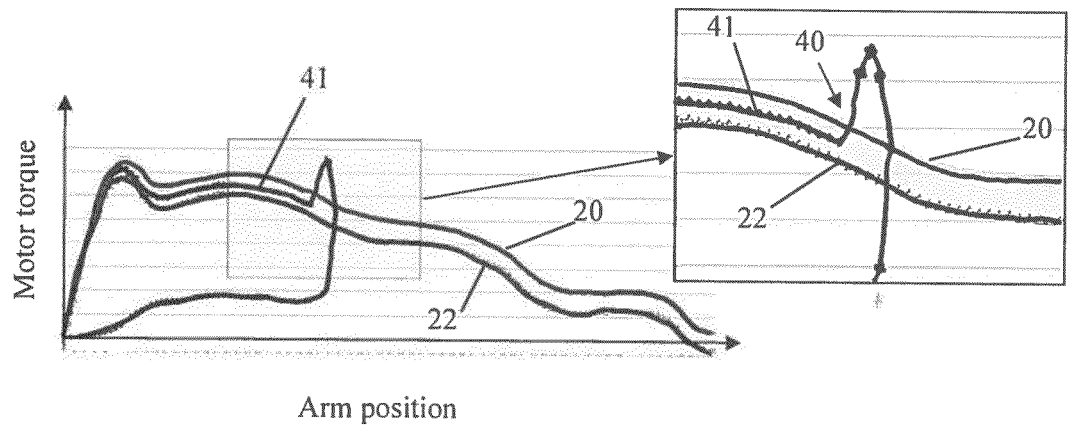
FIG. 3a is a graph of the torque of a motor controlling a disconnect switch as a function of the location of a disconnect switch arm when the arm jams and is subsequently moved back to its initial position, in accordance with an embodiment.
Figure 3B:
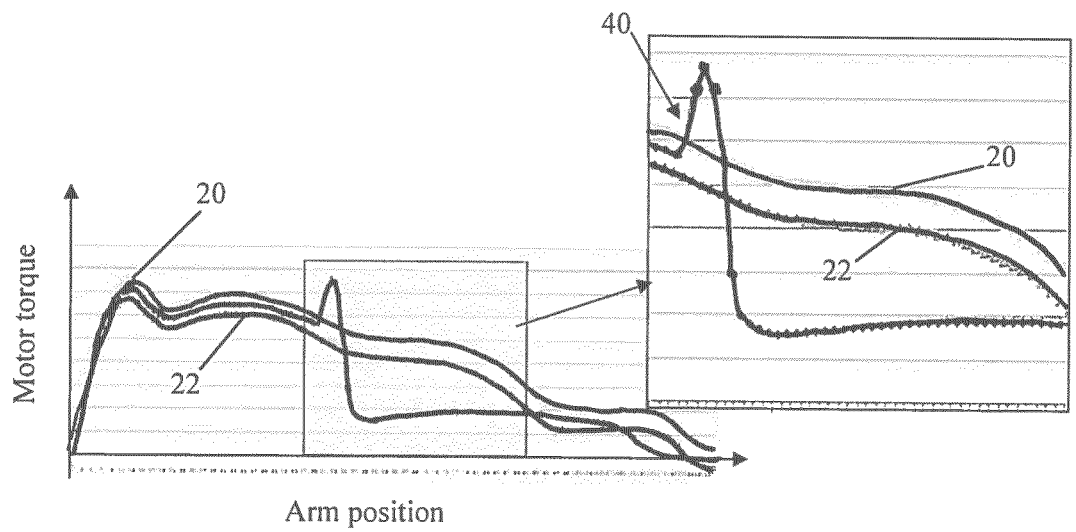
FIG. 3b is a graph of the torque of a motor controlling a disconnect switch as a function of the location of a disconnect switch arm when the arm jams and is subsequently forced to move to its final position, in accordance with an embodiment.

FIG. 3a illustrates an exemplary motor torque as a function of the switch arm 32 location when the arm 32 is blocked and prevented from moving. At point 40, the determined torque 41 exceeds the maximum threshold. The trespassing of the maximum threshold 20 is interpreted as a blocking of the arm 32. The arm 32 is then brought back to its initial position by moving the arm 32 at a speed lower than a normal operation speed using the motor in order to avoid further damage to the switch. The lower speed for the arm 32 results in a torque of the motor lower than the normal operation torque. In FIG. 3b, once the problem has been detected, the arm 32 is moved to its final or target position at a speed lower than the normal operation speed, which results in a torque lower than the normal operation torque.

Figure 4A:
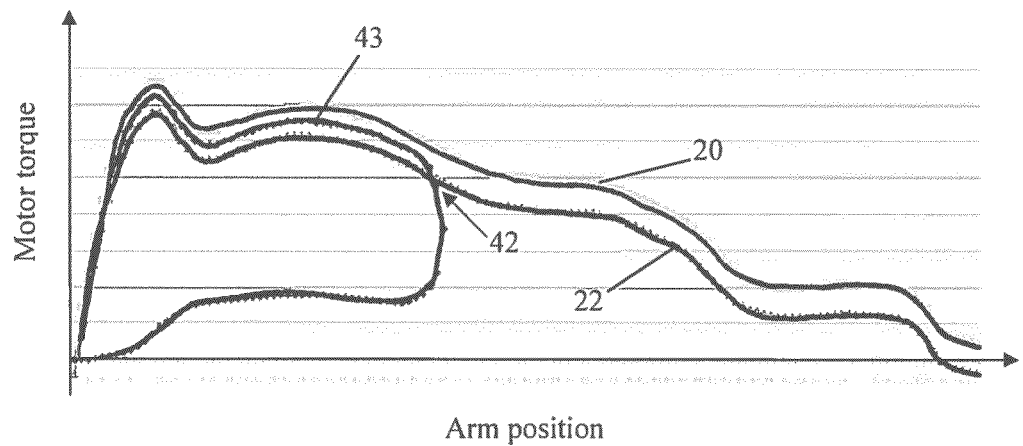
FIG. 4a is a graph of the torque of a motor controlling a disconnect switch as a function of the location of a disconnect switch arm when a break occurs and the arm is moved back to its initial position, in accordance with an embodiment.
Figure 4B:
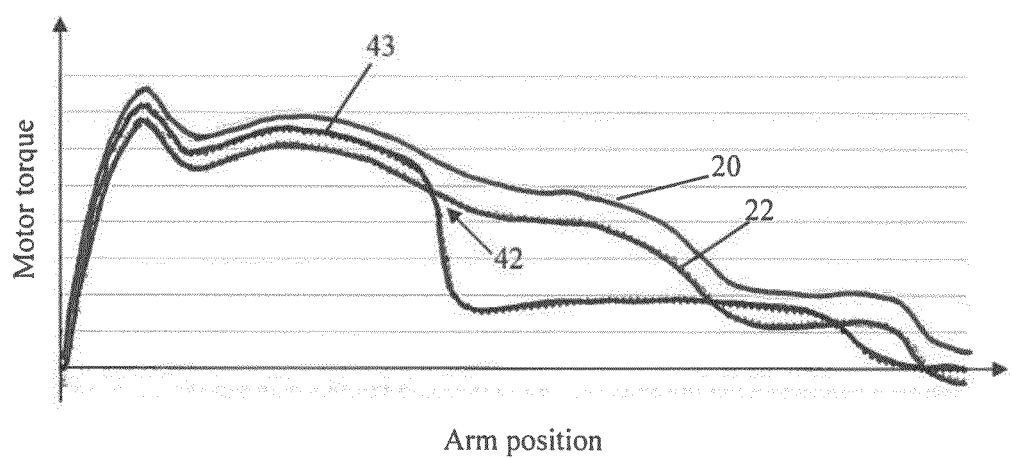
FIG. 4b is a graph of the torque of a motor controlling a disconnect switch as a function of the location of a disconnect switch arm when a break occurs and the arm is forced to move to its final position, in accordance with an embodiment.

FIGS. 4a and 4b illustrate an exemplary motor torque 43 as function of the switch arm 32 location when the arm 32 is broken. At point 42, the determined torque 43 decreases below the minimum threshold 22, which indicates a potential break in the arm 32. In FIG. 4a, once the problem has been detected, the arm 32 is brought back to its initial position by moving the arm 32 at a speed lower than a normal operation speed using the motor in order to avoid further damage to the switch. The lower speed for the arm results in a torque of the motor lower than the normal operation torque. In FIG. 4b, once the problem has been detected, the arm 32 is moved to its final or target position at a speed lower than the normal operation speed, which results in a torque lower than the normal operation torque.

Figure 5:
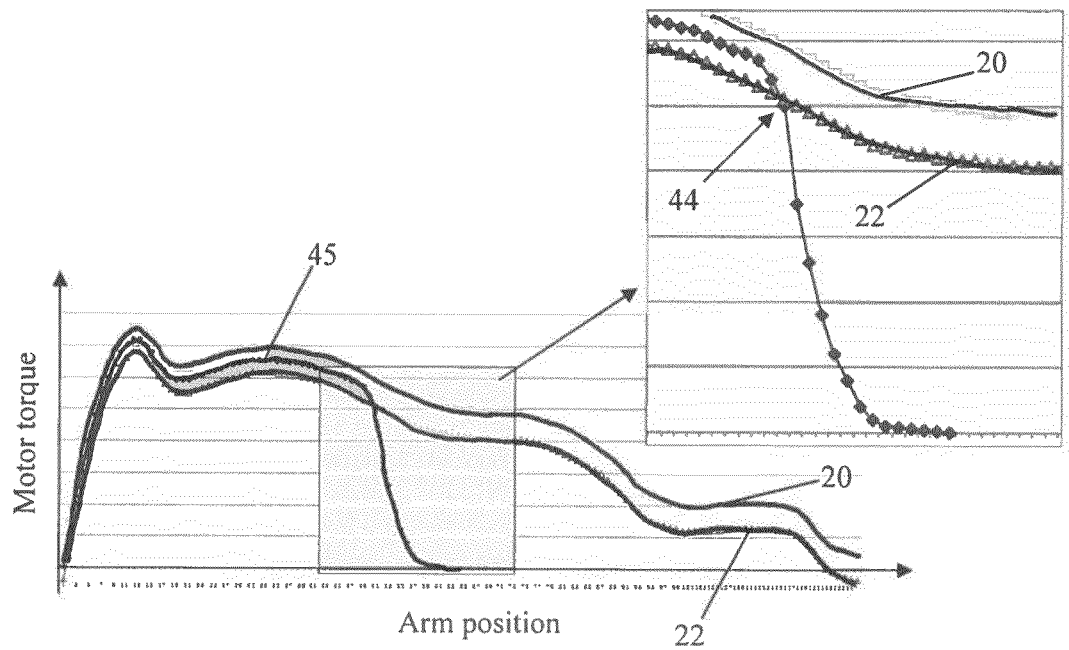
FIG. 5 is a graph of the torque of a motor controlling a disconnect switch as a function of the location of a disconnect switch arm when a break occurs and the motion of the arm is stopped, in accordance with an embodiment.

FIG. 5 illustrates an exemplary torque 45 of the motor as a function of the arm 32 position when the motion of the arm 32 is stopped after detecting a problem. At point 44, the determined torque decreases below the minimum threshold which indicates a potential break in the arm 32. Once the potential break has been detected, the displacement speed of the arm 32 is decreased and the displacement of the arm 32 is stopped.

Figure 6:
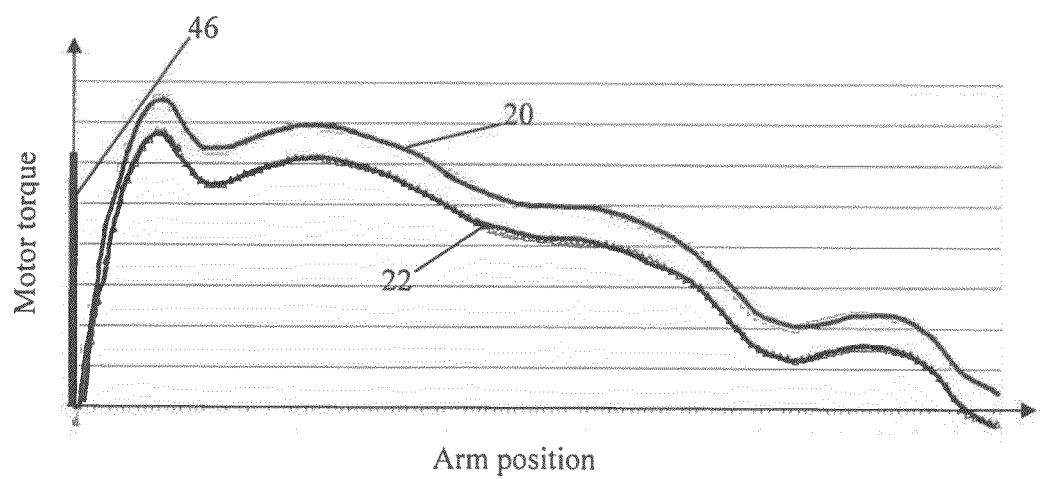
FIG. 6 is a graph of the torque of a motor controlling a disconnect switch as a function of the location of a disconnect switch arm when the arm does not move, in accordance with an embodiment.

FIG. 6 illustrates an exemplary torque 46 of the motor as a function the arm 32 position when the arm 32 does not move. When the arm 32 is in its initial location, the motor is actuated in order to move the arm 32. The torque of the motor 46 increases while the arm 32 does not move from its initial position. This indicates that the arm 32 is locked at its initial position.

Figure 7A:
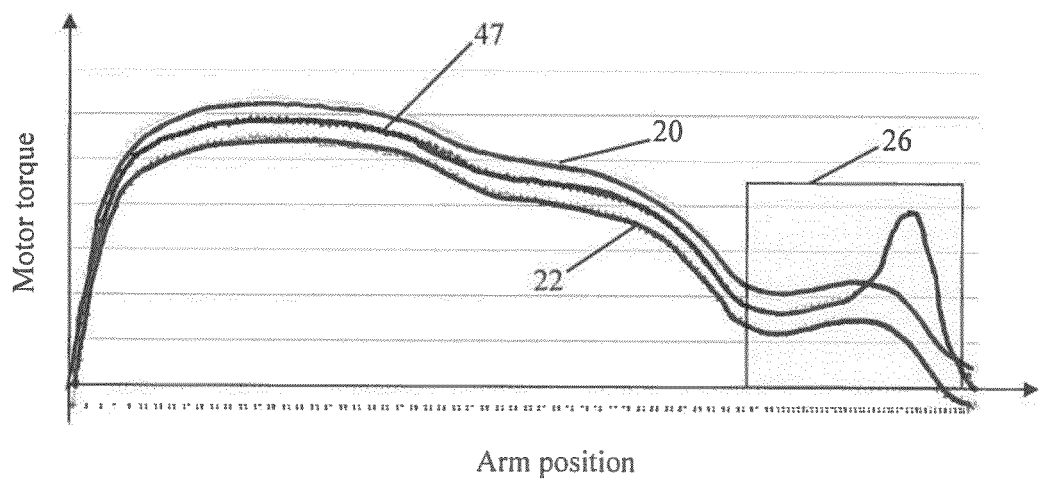
FIG. 7a is a graph of the torque of a motor controlling a disconnect switch as a function of the location of the disconnect switch arm when the arm deviates from its trajectory to hit a ring support of a break jaw, in accordance with an embodiment.
Figure 7B:
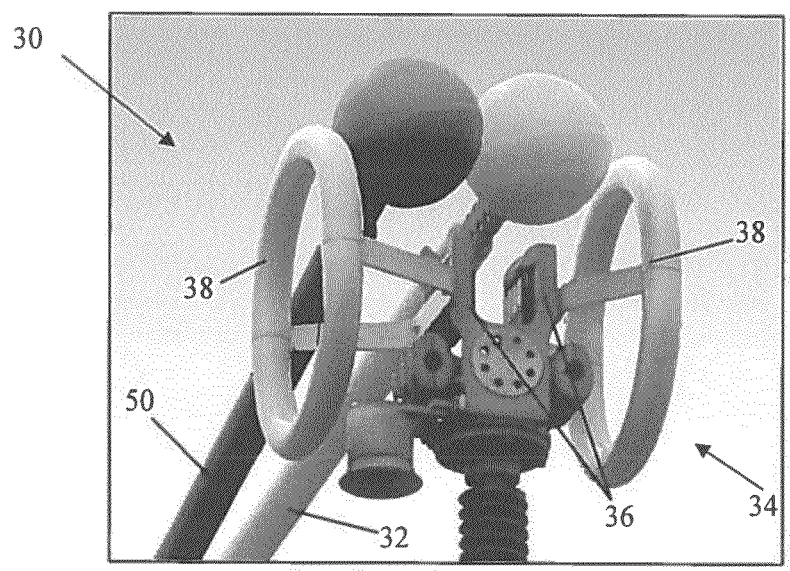
FIG. 7b illustrates an abnormal closing operation of the disconnect switch referred to in FIG. 7a during which the arm of the disconnect switch deviates from its trajectory to hit the ring support.

FIG. 7a illustrates an exemplary torque 47 of the motor as a function of the switch arm 32 location when the determined torque 47 exceeds the maximum threshold 20 in the region 26 adjacent to its closed position. Because the trespassing of the maximum threshold occurs in the region 26 in which the torque of the arm should slightly increase due to the engagement between the arm 32 and the break jaw 34, it is possible that the arm 50 deviated from its target trajectory (illustrated by arm 32) and hit the support ring 38, as illustrated in FIG. 7b.

Figure 8A:
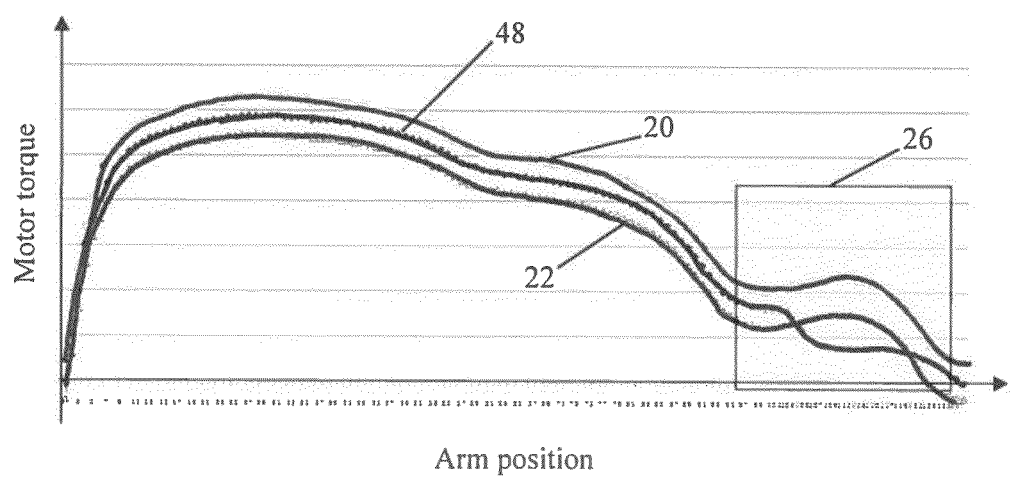
FIG. 8a is a graph of the torque of a motor controlling a disconnect switch as a function of the location of the disconnect switch arm when the arm fails to engage a break jaw, in accordance with an embodiment.
Figure 8B:
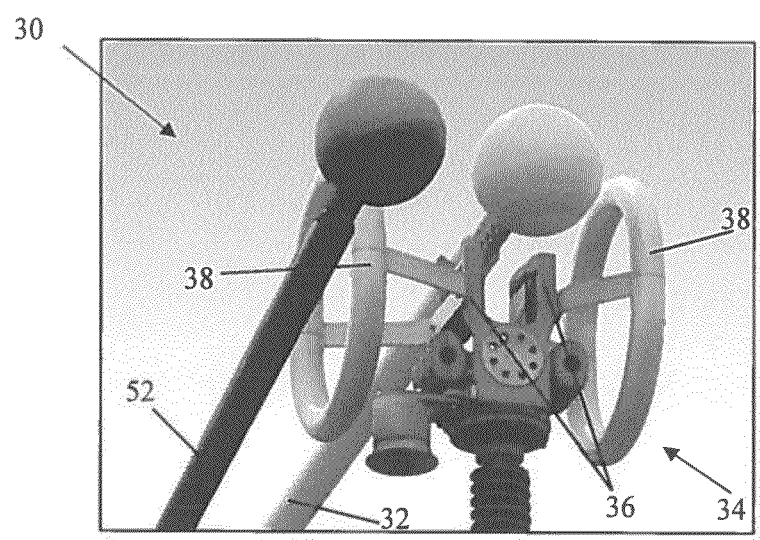
FIG. 8b illustrates an abnormal closing operation of the disconnect switch referred to in FIG. 8a when a switch arm fails to engage a break jaw.

FIG. 8a illustrates an exemplary torque 48 of the motor as a function of the switch arm 32 location when the determined torque decreases below the minimum threshold 22 in the region 26 adjacent to its final position. Because the decrease of the torque 48 below the minimum threshold 22 occurs in the region 26 in which the torque of the arm should slightly increase due to the engagement between the arm and the break jaw 34, it is possible that the arm 52 deviated from its target trajectory (illustrated by arm 32) and failed to engage the break jaw 34, as illustrated in FIG. 8b.

It should be understood that any method for measuring or determining the torque of a motor can be used. In one embodiment, the step 14 of the method 10 comprises measuring the torque of the motor using a torque sensor.

In another embodiment, the torque of the motor is determined using operating parameters. For example, if the motor is a DC electric motor, the electric current applied to the DC electric motor is measured and the torque of the motor is determined by multiplying the measured electric current by a proportionality constant.

In another embodiment, the motor is an AC electric motor such as a squirrel-cage AC electric motor, for example. When determining the torque of a squirrel cage asynchronous motor, certain parameters may be accessible for measurement while others may not. In one embodiment, the available parameters are as follows:

the phase-to-phase stator supply voltage $V_a$ (or $E_a$);
the stator phase current; and
the motor speed.

Using these parameters, a first method for determining torque involves complex manipulations and gives an exact result. A second method is more approximate and easier, but results in a less precise answer. The chosen method depends on available time, the availability of the motor, and the manipulations that can be made on the motor.

In general, a squirrel cage motor comprises a rotor and a stator. The stator is the fixed part of the motor and usually contains pairs of poles disposed at 120° between each phase. This disposition allows for the generation of a rotating field with a speed proportional to the voltage frequency.

The rotor is the rotating part where the internal conductors are short-circuited together. This implies that no coils/brushes connections are required to access the rotor's circuit. The power is transmitted to the rotor by magnetic induction. It is therefore considered to be a rotating transformer. The calculations of the exact model are based on the circuit of a transformer.

The synchronous speed $n_S$ of the motor corresponds to the speed of the rotating field. The poles are always in pairs, i.e. they are multiples of 2 (2, 4, 6, 8, ... ).

$$n_s = \frac{120 \cdot f}{p}$$

$n_s$=synchronous speed (rpm)
f=frequency (Hz)
p=number of poles per motor phase The following table provides the value of the synchronous speed at 60 Hz for different numbers of poles.

| Number of Poles | Synchronous Speed |
| --- | --- |
| 2 | 3600 rpm |
| 4 | 1800 rpm |
| 6 | 1200 rpm |
| 8 | 900 rpm |

If the motor turns at a speed corresponding to the synchronous speed $n_s$, the voltage induced to the rotor is nul (dΦ/dt=0). The rotor current is then nul and therefore, torque as well. It is for this reason that the rotor speed is not equal to the synchronous speed.

One relation used to represent this difference is the slip s. The difference in speed is usually in the order of 5-6% when the nominal load is applied. The slip is given by:

$$s = \frac{n_s - n}{n_s}; s_\% = \frac{n_s - n}{n_s} \cdot 100$$

For example, on the datasheet of a squirrel cage motor, it may be indicated a speed of 3000 rpm, 60 Hz, 220V for a nominal load of 650 W. The synchronous speed $n_s$ is deduced at the speed immediately superior to 3000 rpm, i.e. 3600 rpm. For a 2 pole motor, the slip is given by:

$$s = \frac{n_s - n}{n_s} = \frac{3600 - 3000}{3600} = 16.67\%$$

Modeling the Asynchronous Motor

Figure 9:
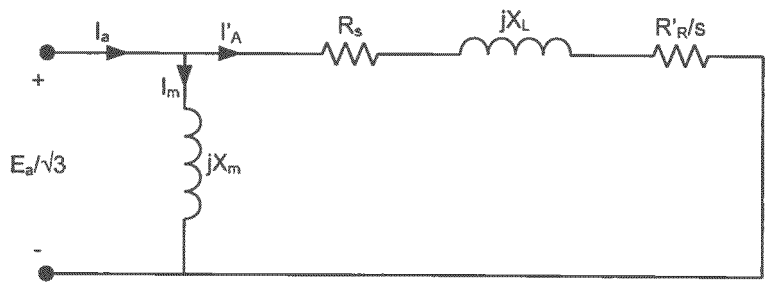
FIG. 9 illustrates an equivalent circuit corresponding to a squirrel-cage electric motor, in accordance with an embodiment.

To evaluate a motor torque in an exact manner, certain circuit parameters (for a circuit equivalent to an asynchronous motor) can be determined experimentally. FIG. 9 is one example circuit. It resembles the equivalent circuit for a transformer, but the equivalent rotor resistance $R'_R$ varies as a function of slip s.

Two circuits may be used to find all of the parameters. For each circuit, the phase-to-phase stator supply voltage $V_a$, the stator phase current, et the motor speed (or the active tri-phase power) are measured, once without a load and once with the rotor locked.

No Load Test (NL)

Figure 10:
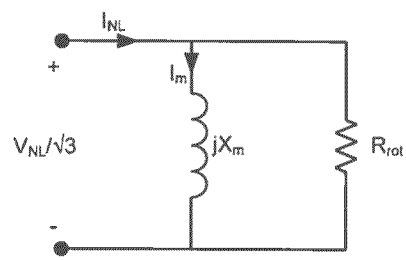
FIG. 10 illustrates an equivalent circuit representing the squirrel-cage electric motor of FIG. 9 when no load is applied to the motor, in accordance with an embodiment.

The motor tree's load is disconnected and the motor turns on empty. The following parameters are measured:
$V_{NL}$: Line to line voltage of the stator (V)
$I_{NL}$: Line current (A)
$P_{NL}$: Active tri-phase power FIG. 10 illustrates the equivalent circuit during the no-load test from which the following parameters can be found:

$$\cos\phi = \frac{P_{NL}}{S_{NL}} = \frac{P_{NL}}{\sqrt{3} \cdot V_{NL} \cdot I_{NL}}$$

$$I_M = I_{NL} \sin\Phi$$

$$X_m = \frac{V_{NL}}{\sqrt{3} \cdot I_M}$$

where $I_M$ is the magnetization current and $X_m$ is the magnetization reactance. $X_m$ is equal to $2*pi*f*L_m$, $L_m$ being the magnetization inductance.

Using approximations in order of size, we obtain:

$$X_m \cong Z_{NL} = \frac{V_{NL}}{\sqrt{3} \cdot I_{NL}}$$

where $Z_{NL}$ is the impedance for the circuit during the no-load test and is given by: $R_{NL}+jX_{NL}$.

The power $P_{NL}$ measured for this no-load test corresponds to the mechanical rotational loss such as friction.

Locked Rotor Test (lk)

The rotor is immobilized and the motor's voltage is slowly increased. The nominal current of the motor should not be exceeded. At this point, the voltage is extremely small. The following parameters are measured:
$V_{lk}$: Line to line voltage of the stator (V)
$I_{lk}$: Line current (A)
$P_{lk}$: Active tri-phase power When the rotor is locked, the slip is unitary (s=1). Therefore, $$Xm = |R_s + R_R + iX_L|$$

where $R_s$ is the stator resistance, $R'_R$ is the rotor resistance, and $X_L$ is the total leakage reactance for the rotor and the stator and is equal to: $2*pi*f*L_L$, $L_L$ being the total leakage inductance for the rotor and the stator.

Figure 11:
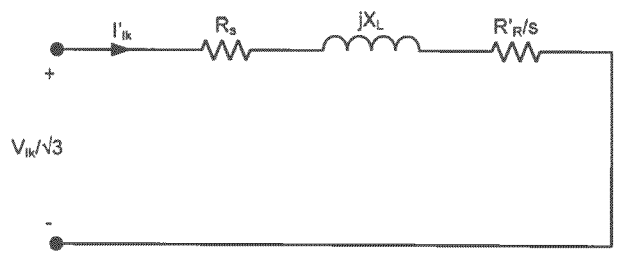
FIG. 11 illustrates an equivalent circuit representing the squirrel-cage electric motor of FIG. 9 when the rotor of the motor is blocked, in accordance with an embodiment.

The equivalent circuit for this test is illustrated in FIG. 11.

$$R_{lk} = \frac{P_{lk}}{3 \cdot I_{lk}^2}$$

$$Z_{lk} = \frac{V_{lk}}{\sqrt{3} \cdot I_{lk}}$$

$$X_{lk} = \sqrt{Z_{lk}^2 - R_{lk}^2}$$

Figure 12:
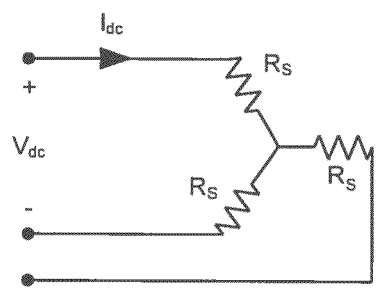
FIG. 12 is a star configuration stator circuit, in accordance with an embodiment.

The stator resistance $R_s$ is measured using an ohmmeter directly between the two phases of the stator. If the stator is linked by a star configuration (see FIG. 12), $R_s$ can be calculated as follows. The star configuration is the most common configuration for such motors. It is possible to control the speed of the asynchronous motor only when the motor is connected in a star configuration.

$$\frac{V_{dc}}{A_{dc}} = 2R_s$$

Figure 13:
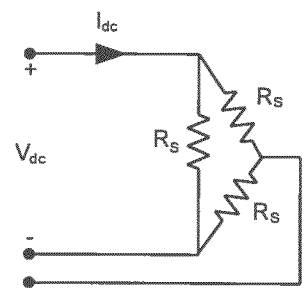
FIG. 13 is a triangle configuration stator circuit, in accordance with an embodiment.

If the stator configuration is a triangle (see FIG. 13), $R_s$ can be found as follows. This configuration is less common. It is encountered when a constant speed is desired.

$$\frac{V_{dc}}{A_{dc}} = \frac{R_s \cdot 2R_s}{R_s + 2R_s}$$

Resistance $R'_R$ and inductance $X_L$ are obtained as follows:

$$R'_R = R_{lk} - R_s$$

$$X_L = X_{lk}$$

For the circuit equivalent to the AC motor, $R'_{R/S}$ is the resistance of the rotor seen on the side of the stator. When the rotor is locked (lk), s is euql to 1 and $R'_{R/S}$ is equal to $R'_R$.

First Method (Exact Torque)

It should be noted that none of the powers presented below are directly available. The power relationships are presented to understand the transfer of power to the rotor as well as the losses.

$$P_{ma} = \frac{R'_R}{s}(I'_A)^2 [W]$$

$$P_{mec} = 3 \cdot (1-s)P_{ma}$$

$$3 \cdot P_{mA} = 3 \cdot P_{ma} - P_{mec} = 3 \cdot P_{ma} \cdot s$$

where $P_{ma}$ is the power transmitted in the air gap per phase, $3.P_{mA}$ is the ohmic losses dissipated in the rotor (in Watts), and $P_{mec}$ is the total mechanical power developed (in Watts).

General Equation for Motor Torque:

The torque is the relationship between speed and mechanical power. This relationship is real at all times for all types of motors.

$$T_{mec} = \frac{P_{mec}}{\omega_m} = \frac{9.55 \cdot P_{mec}}{n} [N \cdot m]$$

$T_{mec}$: mechanical torque (Nm)
$P_{mec}$: mechanical power (W)
$\omega_m$: angular speed of the motor (rad/s)
n: speed of the motor (rpm)

The exact equation of the torque for an asynchronous motor is given by:

$$T_{mec} = 3 \cdot \frac{p}{2} \cdot \frac{P_{ma}}{\omega_s} [N \cdot m]$$

$$T_{mec} = \frac{p}{2\omega_s} \cdot \frac{R'_R}{s} \cdot \frac{E_a^2}{|R_s + R'_R/s|^2 + X_L^2} [N \cdot m]$$

where $E_a$ is the phase-to-phase stator supply voltage, p is the number of poles per motor phase, $\omega_s$ is the synchronous angular speed of the motor in rad/s, $R'_R$ is the equivalent rotor resistance in ohm, $R_s$ id the stator resistance in ohm, $X_L$ is the leakage reactance in ohm, and $P_{ma}$ is the power transmitted in the air gap per phase in watt.

The torque is found to be a function of voltage $V_a$ and slip s. The other parameters are fixed. In the case where voltage $V_a$ is also fixed, torque will only depend on slip.

$$T_{mec} \propto s$$

The relationship between the maximum torque that the motor can develop, also called pull-out torque, is calculated as follows:

$$T_{m,max} = \frac{p}{4\omega_s} \cdot \frac{E_a^2}{\sqrt{R_s^2 + X_L^2} + R_s} [N \cdot m]$$

The torque at start-up (s=1) is found with the following relationship:

$$T_{start} = \frac{p}{2\omega_s} \cdot \frac{R'_R \cdot E_a^2}{|R_s + R'_R/s|^2 + X_L^2} [N \cdot m]$$

Figure 14:
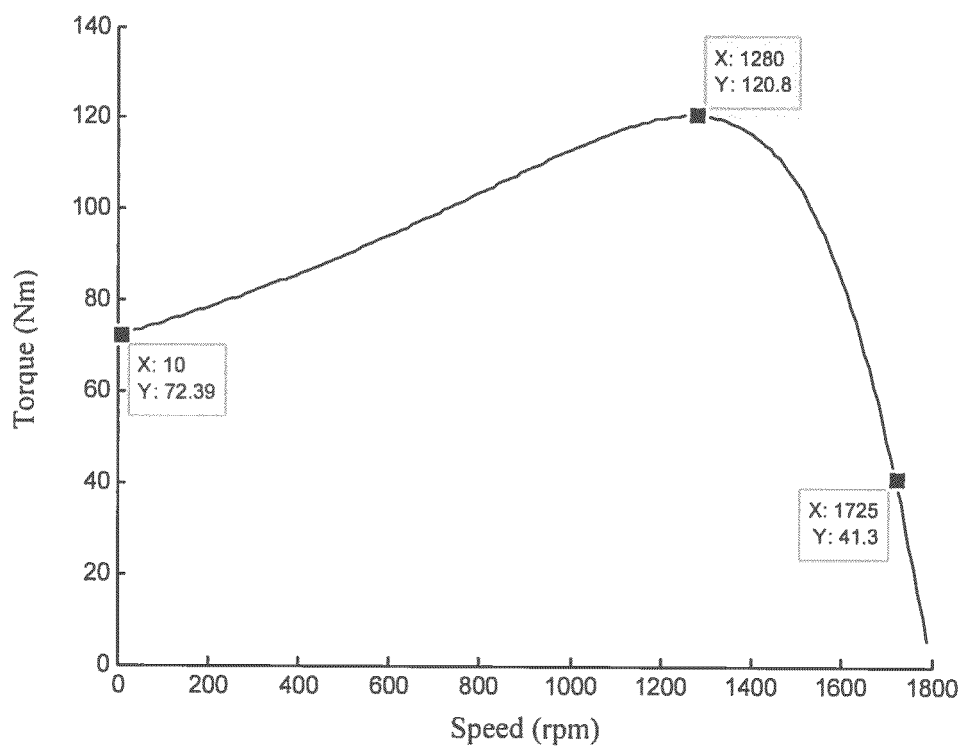
FIG. 14 is a graph of the torque for an asynchronous motor as a function of the motor speed, in accordance with an embodiment.

FIG. 14 is a curve illustrating one embodiment of a torque as a function of the speed of an asynchronous motor, for a motor of 10 HP, 1725 rpm, given by the above equation for $T_{mec}$.

Second Method (Approximate Torque)

Figure 15:
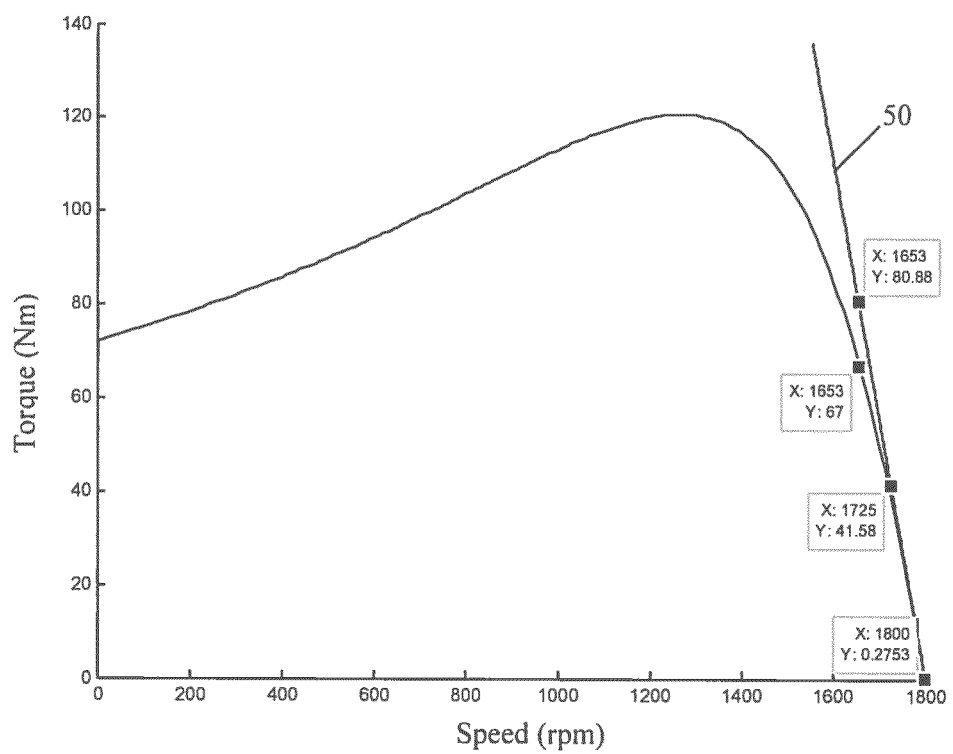
FIG. 15 is a graph of the curve of FIG. 14 for an approximate method of finding torque, in accordance with an embodiment.

Using the curve of FIG. 15, which is an approximate curve of the torque as a function of speed at about 4% of the nominal speed, 10 HP, 1725 rpm, it can be noted that the variation in speed is almost linear around the nominal speed. Therefore, the second method consists in defining the straight line 50 in order to evaluate the torque. It is possible to do this approximation since the motor is operated mainly in the zone in question. This method is not valid if the variation in speed is too significant. The advantage of this method is that only the datasheet of the motor is needed to find torque. No physical parameters around the motor are needed. Only the speed of the motor is measured.

Since the relationship is concentrated around the nominal speed, it is not possible to determine torque at start-up. The limit in variation of speed should be about 4%-5%, i.e. approximately equal to the value of slip s %. If speed measurements are taken for a variation that exceeds 4-5%, precision of the torque is no longer guaranteed.

On the datasheet, we can find the nominal power PHP (HP) and the nominal speed (rpm). The power, in Watts, of the motor is found as follows:

$$P_{nom} = 746 \cdot P_{HP} [W]$$

It is then possible to evaluate the nominal torque:

$$T_{nom} = \frac{9.55 \cdot P_{nom}}{n_{nom}} [Nm]$$

And the straight line is found as follows:

$$m = \frac{T_{nom} - 0}{n_{nom} - n_s} = \frac{T_{nom}}{n_{nom} - n_s}$$

$$b = T_{nom} m \cdot n_{nom}$$

-continued $$T = m \cdot n + b$$

$$T = \frac{T_{nom}}{n_{nom} - n_s} \cdot n + T_{nom} - m \cdot n_{nom}$$

Figure 16:
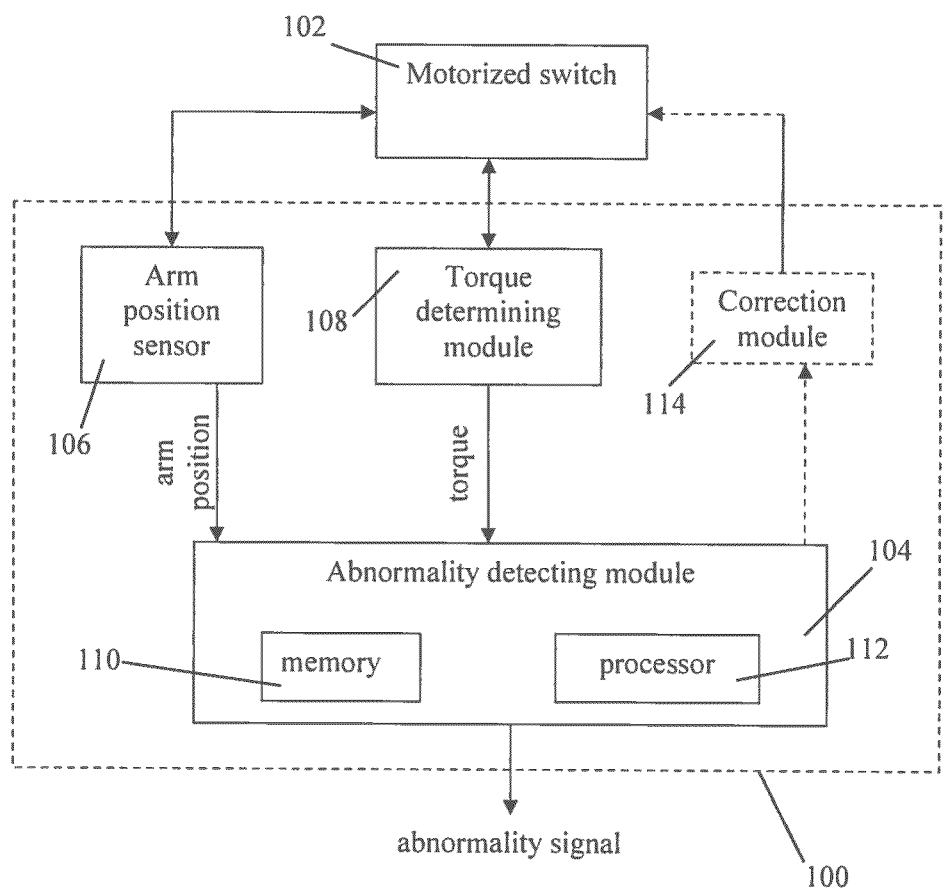
FIG. 16 is a block diagram of a system for detecting an abnormality of a switch, in accordance with an embodiment.

FIG. 16 illustrates one embodiment of a system 100 for detecting an abnormality of a high voltage switch 102. The switch comprises an arm movable between an open and a closed position. The switch 102 further comprises a motor operatively connected to the arm for moving the arm between the open and closed positions.

The system 100 comprises an abnormality detecting module 104, an arm position sensor 106, and a torque determining module 108. The arm position sensor 106 is adapted to determine the position of the arm of the switch 102, and transmit the arm position to the abnormality detecting module 104. As described above, the arm position sensor can e any adequate sensor adapted to determine the position of the switch arm.

The torque determining module 108 is adapted to determine the torque of the motor driving the switch arm, and transmit the determined torque to the abnormality detecting module 104. In one embodiment, the torque determining module 108 is a torque sensor or transducer. In another embodiment, the torque determining module 108 comprises a processing unit adapted to determine the torque from operating parameters of the motor, as described above. In this case, the system 100 further comprises sensors adapted to determine the operating parameters. For example, if the motor driving the switch arm is a DC motor, the system 100 further comprises a current sensor for measuring the current applied to the DC motor.

The abnormality detecting module 104 comprises a memory 110 having a database stored therein. The database comprises torque threshold values for different positions of the switch arm. The abnormality detecting module 104 receive the measured arm position and the torque of the motor corresponding to the measured arm position from the arm position sensor 104 and the torque determining module 108, respectively. The abnormality detecting module 104 further comprises a processing unit 112 configured for comparing the received torque to the torque threshold corresponding to the measured arm position, and generating and outputting an abnormality signal based on the comparison result.

In one embodiment, the torque threshold is a maximum threshold and the abnormality detecting module 104 outputs the abnormality signal when the comparison result indicates that the received torque is superior to the maximum threshold. When the motor torque is inferior to the maximum threshold, no abnormality signal is output. In another embodiment, the torque threshold is a minimum threshold and the abnormality detecting module 104 outputs the abnormality signal when the comparison result indicates that the received torque is inferior to the minimum threshold. When the motor torque is superior to the minimum threshold, no abnormality signal is output. In a further embodiment, two thresholds for the different arm positions, i.e. a minimum and a maximum thresholds, are stored in the memory 110 and the abnormality detecting module 104 outputs an abnormality signal when the received torque is superior to the maximum threshold or inferior to the minimum threshold.

In one embodiment, the abnormality detecting module 104 generates an abnormality signal which simply indicates that a problem occurs. This may be any kind of alarm signal, such as an audible alarm, a light, etc. In another embodiment, the abnormality detecting module 104 is further adapted to diagnose the type of problem encountered by the switch using the methods described above with respect to FIGS. 3a to 8b. In this case, the abnormality detecting module 104 generates an abnormality signal which also comprises the type of problem encountered by the switch. In another embodiment, the abnormality signal comprises an action to be taken in response to the detected abnormality, such as returning the arm to its initial position, slowing down the arm, stopping the arm, etc. In one embodiment the problem and the corrective action are sent via the abnormality signal. In another embodiment, only the corrective action is sent. The abnormality signal may be sent to a control module, which will in turn cause the arm to react in a certain predetermined way, or it can be sent to any other node in a network, remotely or locally.

In one embodiment, the system 100 further comprises a correction module 114 adapted to control the motor connected to the switch arm. The correction module 114 receives the abnormality signal from the abnormality detecting module 104. When receiving the abnormality signal, the correction module 114 may stop the displacement of the switch arm, as illustrated in FIG. 5. Alternatively, the correction module 114 may displace the switch arm to its initial position, as illustrated in FIGS. 3a and 4a, or its final position, as illustrating in FIGS. 3a, 4a, 7a, and 8a. In these cases, the correction module 114 adjusts the displacement speed of the switch arm to lower-than-normal-operation values in order to prevent further damages to the switch.

It should be understood that the torque determining module 108 and/or the correction module 114 and/or the abnormality detecting module 104 can be integrated as a single unit comprising a processor adapted to perform all of the steps.

It should be understood that the system 100 may be integrated in the control module adapted to control the position and speed of the switch arm, or may be provided independently thereof.

The embodiments of the invention described above are intended to be exemplary only. The scope of the invention is therefore intended to be limited solely by the scope of the appended claims.

We claim:

1. A method for determining a malfunction of an arm of a disconnect switch, the method comprising:
    determining a current position of the arm of the disconnect switch operatively connected to a motor, the motor being operated for driving the arm of the disconnect switch;
    determining a torque of the motor when the arm of the disconnect switch is at the current position;
    comparing the torque of the motor to a torque threshold previously associated with the current position of the arm;
    determining a malfunction of the arm of the disconnect switch when the torque of the motor has either exceeded a maximum torque threshold, or is less than a minimum torque threshold; and
    outputting an abnormality signal indicative of the malfunction.

2. The method of claim 1, wherein said comparing comprises comparing the torque of the motor to a maximum threshold and a minimum threshold for the current position of the arm, and said determining a malfunction comprises determining a malfunction of the arm when the torque of the motor exceeds the maximum threshold or is less than the minimum threshold.

3. The method of claim 1, wherein said determining the torque comprises measuring the torque of the motor using a torque sensor.

4. The method of claim 1, wherein said determining the torque comprises determining the torque of the motor from at least one operating parameter of the motor.

5. The method of claim 4, wherein the motor is a direct current (DC) electric motor and the at least one operating parameter comprises an electric current applied to the DC electric motor.

6. The method of claim 4, wherein the motor is an alternating current (AC) electric motor comprising a stator and a rotor, and the at least one operating parameter comprises a phase-to-phase stator supply voltage, a stator phase current, or a motor speed.

7. The method of claim 1, wherein said determining the current position of the arm and said determining the torque of the motor are performed substantially continuously during the operation of the switch.

8. The method of claim 1, wherein said determining the current position of the arm and said determining the torque of the motor are performed in a stepwise manner during the operation of the switch.

9. An apparatus for determining a malfunction of an arm of a disconnect switch, the apparatus comprising:
a memory having a database stored therein, the database comprising a plurality of torque thresholds and associated positions of the arm of the disconnect switch operatively connected to a motor, wherein the motor drives the arm of the disconnect switch; and
a torque comparison unit having a processing unit that receives a current position of the arm and a torque of the motor when the arm of the disconnect switch is in the current position, and that compares the torque of the motor to one of the torque thresholds having an associated position of the arm corresponding to the current position of the arm in order to obtain a comparison result, and that determines a malfunction of the arm of the disconnect switch when the torque of the motor has either exceeded a maximum torque threshold, or is less than a minimum torque threshold, and outputs an abnormality signal indicative of the malfunction.

10. The apparatus of claim 9, wherein the plurality of thresholds comprises a plurality of maximum thresholds and a plurality of minimum thresholds associated with positions of the arm, and the processing unit compares the torque of the motor to one of the plurality of maximum thresholds and one of the plurality of minimum thresholds, and determines a malfunction when said determined torque exceeds the one of the plurality of maximum thresholds or is less than the one of the plurality of minimum thresholds.

11. The apparatus of claim 9, wherein the torque comparison unit further determines the torque of the motor from at least one operating parameter of the motor.

12. The apparatus of claim 11, wherein the motor is a direct current (DC) electric motor and the at least one operating parameter comprises an electric current applied to the DC electric motor.

13. The apparatus of claim 11, wherein the motor is an alternating current (AC) electric motor comprising a stator and a rotor, and the at least one operating parameter comprises a phase-to-phase stator supply voltage, a stator phase current, or a motor speed.

14. A system for determining a malfunction of an arm of a disconnect switch, the system comprising:
a position sensor for determining a current position of the arm of the disconnect switch operatively connected to a motor, the motor being operated to drive the arm of the disconnect switch;
a torque determining module that determines a torque of the motor when the arm of the disconnect switch is at the current position; and
an abnormality detecting module connected to the position sensor and the torque determining module that compares the torque of the motor to a torque threshold previously associated with the current position of the arm to obtain a comparison result, determines a malfunction of the arm of the disconnect switch when the torque of the motor has either exceeded a maximum torque threshold, or is less than a minimum torque threshold, and outputs an abnormality signal indicative of the malfunction.

15. The system of claim 14, wherein the abnormality detecting module compares the torque of the motor to a maximum threshold and a minimum threshold for the current position of the arm, and determines the malfunction when the torque of the motor exceeds the maximum threshold or is less than the minimum threshold.

16. The system of claim 14, wherein the torque determining module is a torque sensor.

17. The system of claim 14, wherein the torque determining module determines the torque of the motor from at least one operating parameter of the motor.

18. The system of claim 17, wherein the motor is a direct current (DC) electric motor and the at least one operating parameter comprises an electric current applied to the DC electric motor.

19. The system of claim 17, wherein the motor is an alternating current (AC) electric motor comprising a stator and a rotor, and the at least one operating parameter comprises a phase-to-phase stator supply voltage, a stator phase current, or a motor speed.

20. The system of claim 17, wherein the torque determining module is integral with the abnormality detecting module to form a single module.

* * * * *